R. S. FLOURNOY.
Animal Traps.
No. 149,735. Patented April 14, 1874.
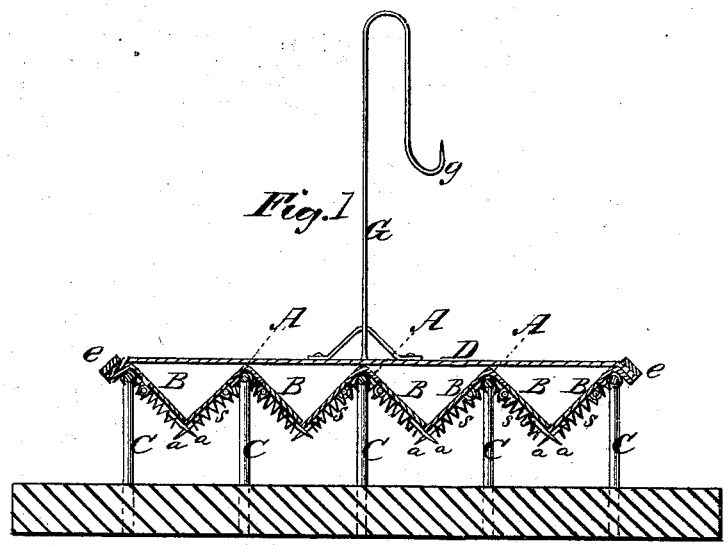
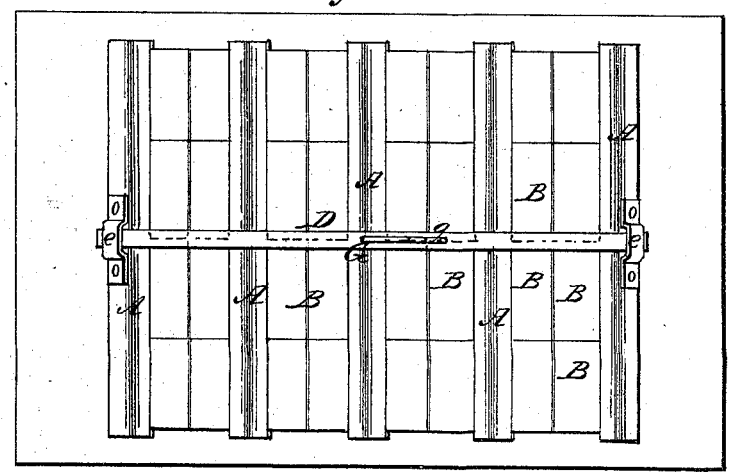
WITNESSES
George E. Upham
Robert Everett
INVENTOR
Rice S. Flournoy,
By Chipman Hosmer & Co.
ATTORNEYS.

UNITED STATES PATENT OFFICE.

RICE S. FLOURNOY, OF TEXANA, TEXAS, ASSIGNOR OF ONE-HALF HIS RIGHT TO HENRY D. STARR, OF SAME PLACE.

IMPROVEMENT IN ANIMAL-TRAPS.

Specification forming part of Letters Patent No. 149,735, dated April 14, 1874; application filed February 7, 1874.

*To all whom it may concern:*

Be it known that I, RICE S. FLOURNOY, of Texana, in the county of Jackson and State of Texas, have invented a new and valuable Improvement in Animal-Traps; and I do hereby declare that the following is a full, clear, and exact description of the construction and operation of the same, reference being had to the annexed drawings making a part of this specification, and to the letters and figures of reference marked thereon.

Figure 1 of the drawing is a representation of a sectional view of my animal-trap. Fig. 2 is a plan view of the same. Fig. 3 is a view showing my trap with occupant.

This invention relates to traps for catching large and small animals; and it consists in the combination of a number of inclined plates or boards, provided with spurs on their lower ends and hinged to fixed ridges at their upper ends, so arranged as to form ridges or elevations and depressions, and to entrap the animals by holding their legs between the spurred ends of the said inclined plates, as will be hereinafter explained.

The following is a description of my improved trap:

In the annexed drawings, letters A designate a number of ridges or angular bars, which are arranged parallel to each other at suitable distances apart, and supported upon posts C, driven into the ground. To each side of each ridge-bar A I hinge flat plates or pieces B B, as indicated at *i*, which pieces have spurs *a a* fixed to their lower ends. These pieces B are inclined toward each other at an angle of forty-five degrees, more or less, and their edges meet at the lowest points of the valleys, their teeth crossing one another, as shown in Figs. 1 and 3.

For the purpose of holding the inclined pieces B in the positions named, I employ springs *s*, which, when an animal treads upon any one of the said pieces, will yield and allow his leg to pass down between the edges of said piece and the one opposite to it, thus entrapping him, as indicated in Fig. 3.

The ridges and valleys may be adapted for large or small animals, and they may be of any desired length.

For the purpose of inducing animals upon the trap, I erect in the center of it a rod, G, having a hook, *g*, formed on its upper end, on which the bait is secured. The rod G is secured to a cross-piece, D, which is secured into loops *e*, and can be removed at pleasure.

It will be observed that the trap is always set ready for catching any number of animals within its capacity.

What I claim as new, and desire to secure by Letters Patent, is—

1. An animal-trap composed of fixed bars A, posts C, hinged pieces B, inclined and spurred, and springs *s*, substantially as described.

2. The hooked bait-rod G, erected on a cross-piece, D, and removably attached to the trap above described.

In testimony that I claim the above I have hereunto subscribed my name in the presence of two witnesses.

RICE SMITH FLOURNOY.

Witnesses:
R. J. BRACKENRIDGE,
HENRY D. STARR.